No. 633,541. Patented Sept. 19, 1899.
C. H. WHEELER & F. W. KREMER.
APPARATUS FOR SETTING RUBBER TIRES.
(Application filed Nov. 19, 1898. Renewed Aug. 22, 1899.)
(No Model.) 3 Sheets—Sheet 1.
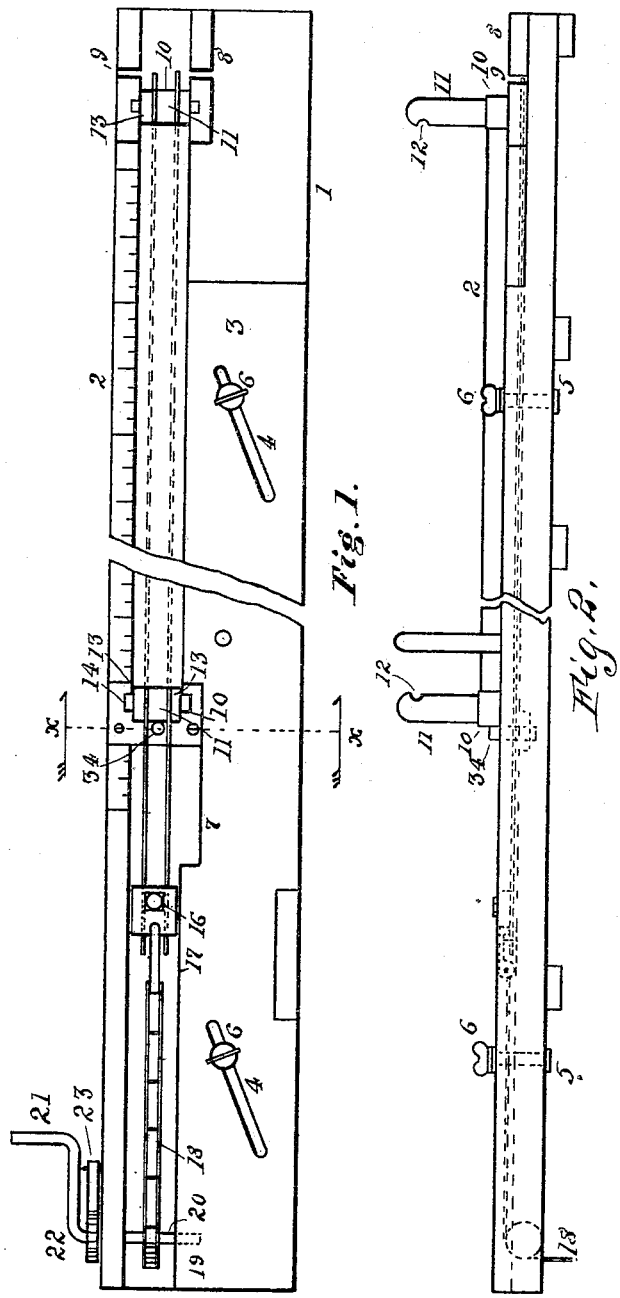
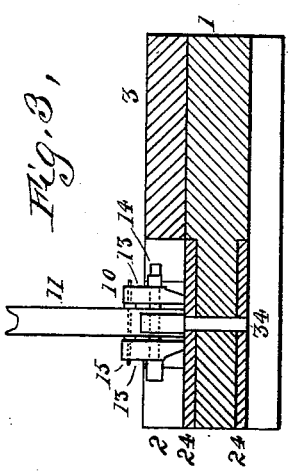
Witnesses:
Marion W. Fuller
A. D. Alexander
Inventors:
Charles H. Wheeler,
Frank W. Kremer,
by Humphrey & Humphrey
attys.

No. 633,541. Patented Sept. 19, 1899.
C. H. WHEELER & F. W. KREMER.
APPARATUS FOR SETTING RUBBER TIRES.
(Application filed Nov. 19, 1898. Renewed Aug. 22, 1899.)

(No Model.) 3 Sheets—Sheet 2.

Witnesses:
Harry Smith
Homer Smith

Inventors:
Charles H. Wheeler,
Frank W. Kremer,
By Humphrey & Humphrey,
attys.

No. 633,541. Patented Sept. 19, 1899.
C. H. WHEELER & F. W. KREMER.
APPARATUS FOR SETTING RUBBER TIRES.
(Application filed Nov. 19, 1898. Renewed Aug. 22, 1899.)
(No Model.) 3 Sheets—Sheet 3.
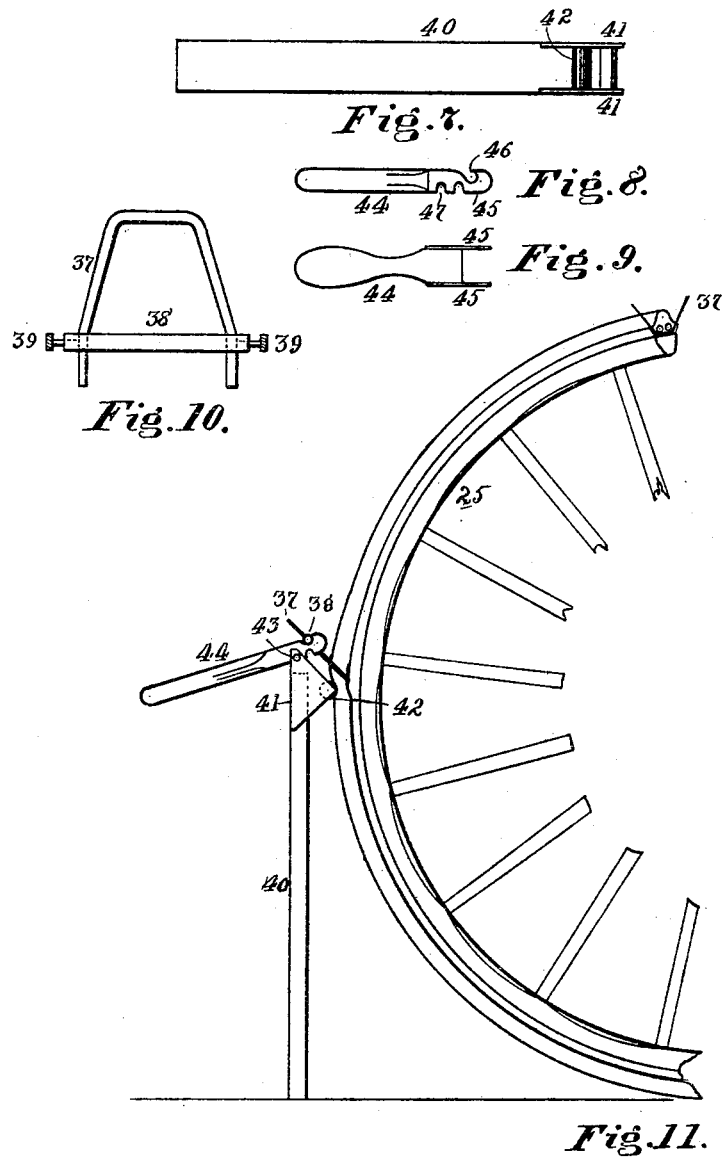
Witnesses:
Harry Smith
Abner Smith
Inventors:
Charles H. Wheeler.
Frank W. Kremer,
by Humphrey & Humphrey
attys.

United States Patent Office.

CHARLES H. WHEELER, OF AKRON, AND FRANK W. KREMER, OF WADSWORTH, OHIO; SAID KREMER ASSIGNOR TO SAID WHEELER.

APPARATUS FOR SETTING RUBBER TIRES.

SPECIFICATION forming part of Letters Patent No. 633,541, dated September 19, 1899.

Application filed November 19, 1898. Renewed August 22, 1899. Serial No. 728,135. (No model.)

*To all whom it may concern:*

Be it known that we, CHARLES H. WHEELER, residing at Akron, in the county of Summit, and FRANK W. KREMER, residing at Wadsworth, in the county of Medina, State of Ohio, citizens of the United States, have invented a certain new and useful Improvement in Apparatus for Setting Rubber Tires, of which the following is a specification.

Our invention has relation to improvements in devices for setting the solid rubber tires of vehicles in which the tire rests in a channeled metallic tire and is reinforced by longitudinal wires embedded in the rubber.

The objects of our invention are to securely set said tires in place by compressing the rubber longitudinally on the embedded wires to permit them to project sufficiently to be gripped by clamps, by drawing the projecting wires together when the rubber shall be placed in the channeled tire, to place them in tension, by securely uniting the ends of the wire in tension, and by sliding the ends of the compressed rubber together over the united ends of the wires, and, finally, fastening the ends of the rubber to complete the tire.

To the aforesaid objects our invention consists in the peculiar and novel construction, arrangement, and combination of parts and their mutual coöperation hereinafter described and then specifically pointed out in the claims, reference being had to the accompanying drawings, forming a part of this specification.

Figure 4:
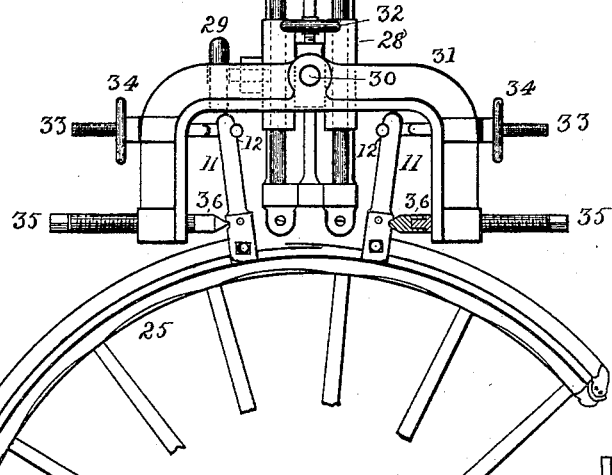
Figure 5:
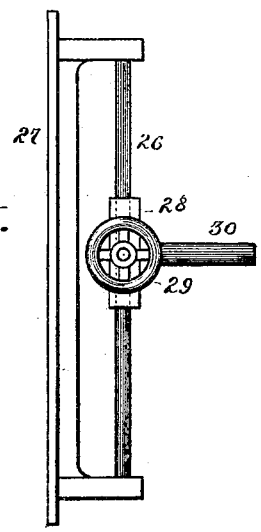
Figure 6:
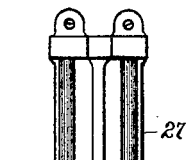

In the accompanying drawings, in which similar reference-numerals indicate like parts in the different views, Figure 1 is a plan of the tire-compressing table with its connected mechanism; Fig. 2, a side elevation of the same; Fig. 3, a section, enlarged, of Fig. 1 at the line *x x;* Fig. 4, an elevation of the apparatus for drawing the wires together; Figs. 5 and 6, details of the apparatus shown in Fig. 4; Figs. 7, 8, 9, and 10, details, enlarged, of the apparatus for sliding the rubber along the wires to bring the ends together; and Fig. 11, a view of these parts united and applied to the purpose of sliding the rubber on the wires.

Referring to the drawings, 1 is a table having at one side a fixed raised strip or ledge 2, graduated for convenience of measuring the rubber in such manner as will best subserve the purpose. Opposite the fixed ledge 2 is a free board 3, pierced with parallel diagonal slots 4, through which pass bolts 5, fastened in the table 1 and provided with thumb-nuts 6, on which it may be moved toward or from the ledge 2 and retained parallel therewith at any distance to accommodate the device to varying widths of tires. The edge of the board 3 adjacent to the ledge 2 is cut away at the point 7 to permit of the movement of a sliding clutch, hereinafter described. At the opposite end of the table 1 (at the right in Figs. 1 and 2) and opposite the fixed ledge 2 is a short similar ledge 8 and through both ledges, at a right angle, a saw-channel 9, in which to insert a tool to cut the rubber at the desired length and at an accurate angle. Fitted and arranged to slide in the channel thus formed on the table 1 are two clamps 10, each consisting of a central post 11, having a notch 12 at its upper extended end for a purpose to be stated and two side jaws 13, adapted to be compressed against the bottom of the post 11 by a bolt 14 and held in position by a guide-pin 15. Arranged to slide in the same channel is a clamp 16, provided with a bolt, by which it may be tightened and adapted to grasp the ends of the tire-wires. This clamp 16 is connected, by means of a hook 17, with a sprocket-chain 18, that runs on a sprocket 19 on a shaft 20, journaled in the board 1 and provided with a crank-handle 21, arranged to be retained by a pawl 23.

Across the table 1, in recesses cut therein on the upper and lower surfaces, are two plates 24, securely fastened, each perforated with a hole, in alinement with each other to receive a pin 34 to constitute an abutment against which the clamp nearest the ratchet-wheel rests. For convenience in adjusting this abutment-pin to varying widths of tires a number of holes may be made across these plates 24; but it has not been deemed necessary to show more than one.

As thus far described the operation of the apparatus is as follows: The tire is placed in the channel on the table 1 and its proper length having been ascertained by means of the graduated edge is cut off with a tool in the miter-grooves 9. Wires are then inserted in openings made for that purpose and their projecting ends fastened in the clamps 10 farthest from the sprocket-wheel and passed loosely between the jaws of the opposite clamp, which rests against the abutment-pin 34, and fastened in the clamp 16. The shaft 20 is then turned, drawing the wires in one direction and compressing the tire endwise until the desired degree of compression is secured, when the clamp against the abutment-pin is tightened and the chain released and the clamp 16 freed. The tire, with the clamps 10 holding the ends of the wires, is then removed and passed about the wheel 25 in the channel of the iron tire and carried to the apparatus as shown in Fig. 4. This apparatus consists of two parallel guide-rods 26, supported between brackets extending from a plate 27, adapted to be fastened to a firm post or other support, and on which is a slide 28, arranged to be held at any height by a set-screw operated by a hand-wheel 29 and having a projecting shaft 30. On this shaft is pivotally supported a yoke 31, arranged to be held by a set-screw 32. Near the corners of this yoke are oppositely-disposed openings in which freely move bolts 33, having their inner ends offset and bent in a right-angled hook, as shown in Fig. 6. The opposite ends of these bolts are screw-threaded and fitted to hand-wheel nuts. In the ends of the yoke 31 are screw-threaded openings in which are oppositely-disposed screws 35, having on their inner ends free pointed heads 36. The wheel, with the tire and clamps, as hereinbefore stated, being brought to this apparatus and properly supported on a stub-axle or other convenient manner, the notched ends of the center posts 11 of the clamps 10 are inserted in the hooked ends of the bolts 33. The screws 35 are then turned inward against the lower part of the clamps 10, as shown in Fig. 4, and turned up until the wires are in tension and their ends pass each other. During this process the set-screw operated by the hand-wheel 29 and the set-screw 32 are released to permit the yoke to rise or fall freely and to rock in either direction to accommodate itself to the position of the wires, and the bolts 33 serve to direct the motion of the wires in a tangent to the circumference of the wheel and to insure their uniting accurately, this being accomplished by turning the hand-nuts to raise the wires and releasing them to lower them. The ends of the wires are then brazed together, and when cool the clamps are removed. The tire is now compressed endwise on the wires and the wires in tension and fastened. To bring forward the ends of the rubber to meet and form a union, short wires (see 37, Figs. 10 and 11) have been previously passed under the rubber wire, with their ends projecting. The ends of these wires are then fastened in holes in a bar 38 by means of set-screws 39. A post 40 is then placed endwise on the floor adjacent to the wheel, in the upper end of which are two plates 41, which are made to extend in front of the post and between which is journaled a roller 42, and between which at their highest part is a cross-rod 43. Although for convenience the post 40 is shown for the purpose of forming a fulcrum for the lever 44, any other support that will subserve the purpose in the same relative position may obviously be substituted. A short lever 44, having at its end, on opposite sides, similar plates 45, is then used. The upper ends of these plates have similar hooks 46 to engage one of the bars 38, and their opposite edges are provided with notches 47 to rest on the rod 43. The handle of the lever is then pressed down, drawing the tire away from the channel of the metallic tire, and the wheel 25 slowly turned toward the device, the result being to permit the rubber to expand as it is freed from the channel of the iron tire, and consequently to elongate toward its cut end, the wires 37 serving to raise the rubber from the channel of the iron tire and the roller 42 operating to press it along the wires. This operation is continued on each end of the tire until its ends meet, when they are cemented together and the wires 37 withdrawn, leaving a complete rubber tire on the wheel.

In process cement may or may not be used to cause the rubber and metal tires to adhere, and if cement is used it may be placed in the channel of the iron tire before the rubber is inserted, or it may be applied with a narrow-spouted can under the rubber as it is raised by the wires 37 as the wheel is revolved. By this process also the rubber is compressed equally about the wheel, and when stripped along the wires, as hereinbefore stated, the tension is equally distributed around the wheel.

We claim as our invention—

1. In a rubber-tire-setting machine a table having a fixed and a movable ledge, an abutment-pin, a windlass and chain and devices for retaining said windlass, in combination with clamps adapted to retain the ends of the wires in the tire, and a clamp connected with said chain arranged to draw said wires lengthwise in said tire substantially as shown and described.

2. In a rubber-tire-setting machine a table having a movable ledge, an abutment-pin, a windlass and chain, devices for retaining said windlass, clamps to retain the ends of the wires in the tire, and a clamp connected with said chain to draw said wires in the tire, of a graduated fixed ledge and miter-grooves to form a tool-guide to cut said tire substantially.

3. The combination a table having a movable ledge, a fixed ledge, an abutment-pin, a windlass and chain and a clamp to hold the wires of a rubber tire, of clamps consisting of a central post, notched to afford a hold for compressing devices, two side jaws, a guide-pin to regulate the movement of said side jaws and a bolt to draw them together, substantially as shown and described.

4. An improved clamp for rubber-tire-setting machines consisting of a central post longer than the side jaws and notched to afford a hold for a compressing device, and two side jaws in combination with a guide-pin and a bolt to compress said jaws, substantially as shown and described.

5. In a rubber-tire-setting machine, the combination with clamps with projecting ends to hold the ends of the wire with the rubber compressed between them of a yoke provided with two sets of oppositely-disposed screws, one set thereof being arranged to draw outwardly on the ends of said clamp ends, and the others arranged to push them inwardly below said ends, substantially as shown and described.

6. An improved machine for drawing together the ends of wires in a rubber tire consisting of vertical ways, a slide mounted on said ways, a yoke pivotally connected with said slide, set-screws to retain said slide and yoke, oppositely-disposed screws arranged to draw outward the ends of clamps holding said wires and oppositely-disposed screws to press them together substantially as shown and described.

7. An improved apparatus for extending the rubber of an elastic tire upon embedded wires fastened in tension about the wheel, consisting of wires placed under said tire with projecting ends, a clamp to receive the ends of said wires, a lever to engage and draw said clamp a fulcrum for said lever, and a roller to engage said tire adjacent to said wire, substantially as shown and described.

In testimony that we claim the above we hereunto set our hands.

CHARLES H. WHEELER.
FRANK W. KREMER.

In presence of—
  C. P. HUMPHREY,
  C. E. HUMPHREY.